United States Patent Office 3,518,538
Patented June 30, 1970

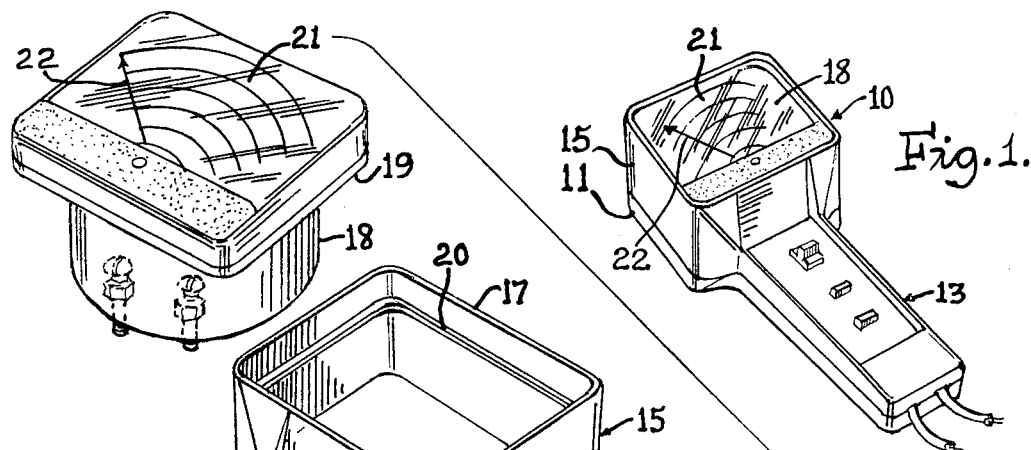
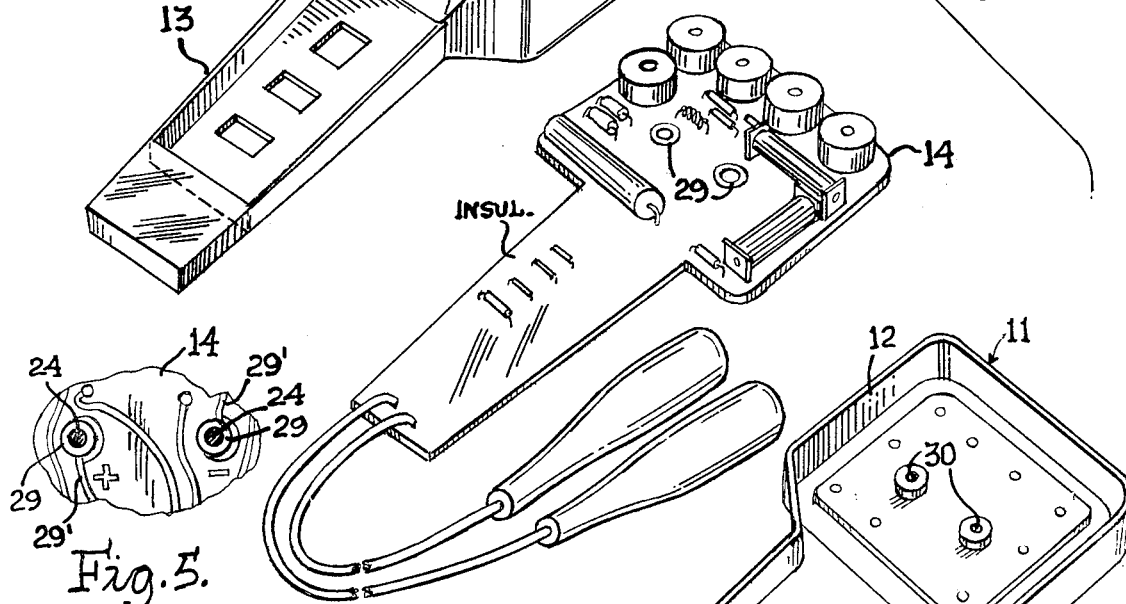
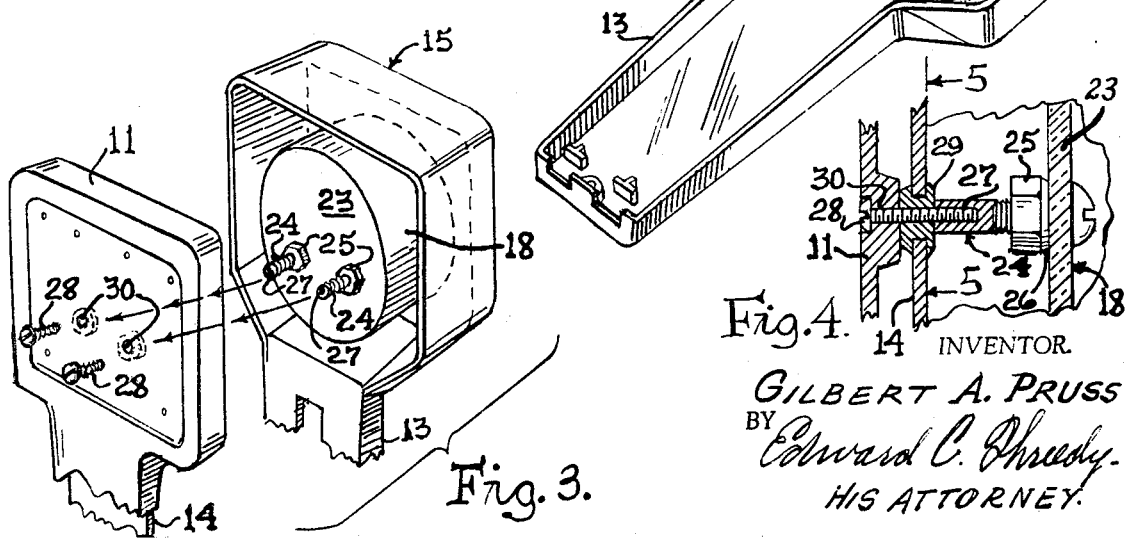

3,518,538
REPLACEABLE METER UNIT FOR A TACHOMETER OR LIKE INSTRUMENT
Gilbert A. Pruss, Chicago, Ill., assignor to Milton Manufacturing Co., Inc., Chicago, Ill., a corporation of Illinois
Filed June 16, 1967, Ser. No. 646,662
Int. Cl. G01p 3/42
U.S. Cl. 324—169                                    2 Claims

ABSTRACT OF THE DISCLOSURE

A tachometer or like instrument having a replaceable meter unit mounted within a holder, which holder and meter unit are detachably connected in assembled relation by conductor screws incorporated as a part of the electric circuit of the meter unit and the circuit of the instrument panel of the tachometer.

BACKGROUND OF INVENTION

This invention relates to the art of testing instruments such as tachometers or the like for checking and tuning up the ignition system of an internal combustion engine to determine the efficiency of its operation and whether its operating power is constant and at its maximum.

The invention is an advancement over the prior art in that the invention utilizes a simple and efficient arrangement for replacing the meter unit of the tachometer without requiring circuit wires to be cut and subsequently resoldered after replacement of the unit within the enclosure of the tachometer.

SUMMARY OF INVENTION

Tachometers commercially in use and with which I am familiar are constructed in a manner such that the circuit wires between the meter unit and the instrument panel are of a permanent connection such that should the meter unit become defective, which in many instances occurs because of the delicate nature of the meter and the rough handling to which it is subjected during use, the entire tachometer must be returned to the factory for repair or replacement. This necessitates taking the tachometer out of service, resulting in the loss of its use and in inconvenience to the operator.

My invention provides a meter unit and and an instument panel which are connected together by bolts which constitute a connection between the circuit of the meter unit and that of the instrument panel. Such arrangement is advantageous over prior devices of the type herein referred to, in that all that is necessary for the operator to do to remove a defective meter unit, is to remove the bolts, which permits the entire assembly of the tachometer, that is, the meter unit, the holder therefor, the instrument panel and the panel-supporting back plate, to be disassembled and reassembled for purposes of replacement of the defective meter unit. The defective meter unit is simply removed from the assembly and a replacement meter unit substituted without the operator being deprived of the service of the tachometer. Such substitution is effected without the use of special tools and without the necessity of splicing or soldering the circuit wires between the meter unit and the instrument panel, all this being accomplished by the operator.

Other objects will appear hereinafter.

The invention consists in the novel combination and arrangement of parts to be hereinafter described and claimed.

The invention will be best understood by reference to the accompanying drawings showing the preferred form of construction, and in which:

FIG. 1 is a perspective view of one embodiment of the invention;

FIG. 2 is a perspective view of the parts as shown in FIG. 1, in exploded relation with respect to each other;

FIG. 3 is a fragmentary perspective view of the meter unit in its relationship with the instrument panel;

FIG. 4 is a fragmentary sectional detail view showing the connection between the meter unit and the instrument panel;

FIG. 5 is a fragmentary sectional detail view taken substantially on line 5—5 of FIG. 4.

The preferred embodiment of the invention as shown in the drawings includes a testing instrument 10 which in the present instance is a tachometer for testing the performance operation of the ignition system of an automobile. It includes an enclosure housing comprising two sections 11 and 15 superimposed one upon the other. As shown in FIGS. 1 and 2, the sections provide together a handle 13. Extending around the inner surface of the side walls of the section 11 is a flange 12.

An instrument panel carrying certain electronic elements and a circuit therefor is shown at 14 and is of a configuration to snugly fit into the section 11 and the handle portion 13 thereof. This invention is not concerned with the type of circuit carried by the panel 14 nor the electronic elements associated therewith.

The section 15 has wall portions 17 encircling a meter unit 18 when the latter is positioned in the section 15. This unit may be of any approved construction, including a shoulder portion 19, which when the meter unit 18 is mounted in the section 15, rests upon the flange 20. It also includes a dial 21 and indicator finger 22, neither of which constitutes any part of the present invention.

The inner wall 23 of the meter unit 18 is provided with laterally inwardly extending studs 24 of conductive material and upon which are threaded nuts 25 which fixedly connect the studs 24 to the wall 23 and which are also connected as at 26 to the ends of circuit wires of the meter unit. These studs 24 have formed therein threaded sockets 27 which are adapted to have threaded therein threaded head-bearing connecting bolts 28. These bolts 28 are projected through grommets 29 formed in the instrument panel 14. Such grommets have connected thereto circuit wires 29' of the circuit on the panel 14, as shown in FIG. 5. The heads of the threaded bolts 28 are located in sockets 30 formed in the rear wall of the section 11.

As is apparent, the bolts 28 when threaded in the socket 27, removably connect the sections 11 and 15 and meter unit 18 together as a unitary assembly, easily disassembled when desired, by the mere removal of the bolts 28.

The connection between the circuit wires 29' and the circuit wires 26, grommets 29, and the studs 24, must be in firm contact with respect to each other. This is accomplished by the bolts 28 which, when the tachometer is in assembled relation as shown in FIG. 1, firmly bear the studs 24 against the grommets 29. While the bolts 28 may be formed of any suitable material, such bolts, may be, if desired, formed of conductive material whereby to assure firm circuit contact between the grommets 29 and the studs 24.

To disassemble the tachometer for the purpose of replacing a defective meter, all that is necessary for the operator to do is to remove the threaded bolts 28, at which time the meter unit 18 may be removed from its holder 15 and an operative meter unit substituted. After such substitution, the bolts 28 are rethreaded into the threaded sockets 27, to firmly hold the assembly together.

Having thus described my invention, what I claim as new and desire to protect by Letters Patent is:

1. In a housing for a tachometer-like instrument having a replaceable electrical meter unit and separate associated circuit components, wherein the improvement comprises
    (a) a dielectric holder section for the meter unit consisting of an open end meter housing and an integral handle for the instrument,
    (b) a like second section superimposed on one side of said holder section so as to close one end of said meter housing and one side of said integral handle,
    (c) a meter unit positionable in and adapted to close the other open end of said meter housing and providing exposed hollow internally threaded terminals adapted to receive connectors for connecting said meter unit to the separate associated circuit components and for connecting said second section to said holder section in an assembled relationship,
    (d) a panel carrying the separate associated circuit components and of a size to be disposed within said meter housing and said integral handle of said sections,
    (e) current conductors provided by said panel in circuit with the circuit components thereon and in contact with the ends of said exposed hollow terminals of the meter unit when said panel and meter unit are placed within said sections, and
    (f) threaded connectors carried by said second section threadable through said current conductors and into the exposed hollow terminals of the meter unit for mounting the meter unit, panel, and sections into a unitary assembly.

2. In a housing for a tachometer-like instrument as defined by claim 1 wherein said meter housing of said holder section provides an internal seat for a portion of the meter unit when the same is mounted therein and wherein said current conductors provided by said panel comprise ringlike elements with their center openings in axial alignment with the center openings of said hollow terminals provided by the meter unit.

References Cited

UNITED STATES PATENTS

| | | | |
|---|---|---|---|
| 2,581,734 | 1/1952 | Triplett | 324—156 |
| 2,701,969 | 2/1955 | Meredith | 324—156 |
| 2,752,580 | 6/1956 | Shewmaker | 174—68.5 |
| 2,836,793 | 5/1958 | Kelly | 324—156 |
| 2,864,057 | 12/1958 | Connelly | 324—156 |
| 2,902,652 | 9/1959 | Peterson | 324—156 |
| 2,968,765 | 1/1961 | Parmater | 324—156 |
| 3,383,587 | 5/1968 | Tripp | 324—70 |

RUDOLPH V. ROLINEC, Primary Examiner

M. J. LYNCH, Assistant Examiner

U.S. Cl. X.R.

324—156